(12) United States Patent
Filman et al.

(10) Patent No.: US 9,588,992 B2
(45) Date of Patent: Mar. 7, 2017

(54) DISPLAYING IMAGES INTERESTING TO A USER

(75) Inventors: Sarah Michelle Filman, Seattle, WA (US); Jason Fergus Moore, Redmond, WA (US); Jiamin Zhu, Sammamish, WA (US); Mark Kramer, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 181 days.

(21) Appl. No.: 12/894,264

(22) Filed: Sep. 30, 2010

(65) Prior Publication Data

US 2012/0084731 A1    Apr. 5, 2012

(51) Int. Cl.
*G06F 3/048*    (2013.01)
*G06F 17/30*    (2006.01)

(52) U.S. Cl.
CPC ................... *G06F 17/3028* (2013.01)

(58) Field of Classification Search
USPC ........................................... 715/838
See application file for complete search history.

(56) References Cited

U.S. PATENT DOCUMENTS

| 2008/0092054 A1* | 4/2008 | Bhumkar et al. ............ 715/739 |
| 2009/0055746 A1 | 2/2009 | Dimitrova et al. |
| 2009/0089711 A1 | 4/2009 | Dunton et al. |
| 2009/0172547 A1 | 7/2009 | Sparr |
| 2010/0023488 A1 | 1/2010 | Hur et al. |
| 2010/0042926 A1 | 2/2010 | Bull et al. |
| 2010/0057555 A1* | 3/2010 | Butterfield ........ G06F 17/30038 705/14.41 |
| 2011/0066497 A1* | 3/2011 | Gopinath ........... G06Q 30/0255 705/14.53 |

FOREIGN PATENT DOCUMENTS

WO    2009056437 A1    5/2009

OTHER PUBLICATIONS

Microsoft.com, "Find a picture on your computer," Oct. 2009, 1 page.*
Perez; Sarah, "Better Photo Management for Mac? iLovePhotos Hopes So"—Published Date: Sep. 8, 2008, pp. 1-4, http://www.readwriteweb.com/archives/better_photo_management_for_mac_ilovephotos.php.
"Google Screensaver"—Published Date: Mar. 27, 2007 http://googlesystem.blogspot.com/2007/03/google-screensaver.html.
(Continued)

*Primary Examiner* — William Trapanese
(74) *Attorney, Agent, or Firm* — Julie Kane Akhter; Tom Wong; Micky Minhas

(57) ABSTRACT

One or more techniques and/or systems are disclosed for displaying images in a user's online page, such as to provide an engaging and interesting user experience. A subset of one or more images is identified from a set that comprises user accessible images. Images for the subset are identified selecting one or more images from the set of user accessible images that meet a desired user interest threshold. The subset of selected images is then loaded onto the user's online page, such as an online service landing page, in an arrangement (e.g., slide show) of the images.

20 Claims, 7 Drawing Sheets

(56) References Cited

OTHER PUBLICATIONS

"Flickr slideshow"—Retrieved Date: Aug. 16, 2010 http://www.flickrslideshow.com/.
Chinese Search Report cited in Chinese Application No. 201110293071.1 dated Mar. 5, 2013, 2 pgs.
Reply Chinese Search Report cited in Chinese Application No. 201110293071.1 dated Jul. 3, 2013, 4 pgs.
Third Chinese Office Action cited in Chinese Application No. 201110293071.1 dated Jun. 9, 2014, 3 pgs.
Reply third Chinese Office Action cited in Chinese Application No. 201110293071.1 dated Aug. 27, 2014, 4 pgs.
Second Chinese Office Action cited in Chinese Application No. 201110293071.1 dated Nov. 13, 2013, 1 pg.
Reply Second Chinese Office Action cited in Chinese Application No. 201110293071.1 dated Jan. 22, 2014, 4 pgs.
Fifth Chinese Office Action cited in Chinese Application No. 201110293071.1 dated Jun. 23, 2015, 3 pgs.
Fourth Chinese Office Action cited in Chinese Application No. 201110293071.1 dated Dec. 18, 2014, 3 pgs.
"Notice of Allowance Issued in Chinese Patent Application No. 201110293071.1", Mailed Date: Dec. 24, 2015, 6 Pages.
Response to Fourth Chinese Office Action cited in Chinese Application No. 201110293071.1 dated Mar. 2, 2015, 3 pgs.

* cited by examiner

DISPLAYING IMAGES INTERESTING TO A USER

BACKGROUND

In a computing environment, online services are available where users can upload or link to documents, files, images, applications, and more, in a combined service hosted by a site. Typically, users are able to customize the landing page, start page, or homepage for these online service sites to comprise interesting and/or engaging information for the user. Often, users include images, video and other media in their online experience, including customizing their landing pages. For example, a user may find an interesting image or video while browsing online and link or embed the image on their landing page, or some other page used for their online activities.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

When a user utilizes an online service that may aggregate services, such as online storage, image management, document management, news feeds, social networking, they can typically personally customize the pages viewed by the user. For example, a user homepage can be customized with desired news feeds, interesting images or image feeds, social network updates, email accounts, and many other components, applications, or widgets offered by the online service. In particular, a user may utilize an online service that manages images for the user.

For example, the user can collect images (e.g., take pictures, download pictures, receive pictures, captures video stills, etc.), upload them or link them to the service, and manage them in a manner desired by the user. The user can select favorites to display, add interesting information to the image, arrange them in presentations, store them in organized folders, upload new images, and send and receive other images. Often, the user views or presents images that have a particular interest to the user, such as newly taken or received pictures, images having interesting subjects, images that are trending popular online, and more.

However, current online services merely present images for display, such as when the user opens their online service page (e.g., landing page for the service), based a time they are taken or randomly, unless the user actually performs an action to designate an interesting image. When a user opens their landing page for an online image management service, where they share and consume images, they may wish to have a more engaging, aesthetically pleasing and interesting presentation. Further, current techniques merely provide for rotating or iterating a preselected number of images through a display presentation (e.g., where the images are chosen randomly or according to some default or user defined order, such as by time taken, etc.).

Accordingly, one or more techniques and/or systems are disclosed for providing a more engaging and interesting presentation of images to the user, for example, when they open their landing page for an online service (e.g., image management service). The techniques and systems described herein can provided a personal summary view of what may be going on with the user's images, images friends and connections have uploaded, and other interesting images gleaned online, for example. For example, a slide show presentation of images that are of particular interest to the user can be presented upon opening the landing page in the user's browser.

In one embodiment for displaying images in a user's online page, a subset of one or more images can be identified from a set of user accessible images. Identifying the subset can comprises selecting one or more images from the set that meet a desired user interest threshold (e.g., as determined by the user's online and local interactions and preferences). After selecting a subset, an arrangement (e.g., slide show) of the images in the subset can be loaded to the user's online page, for example, comprising at least some of the images in the subset.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
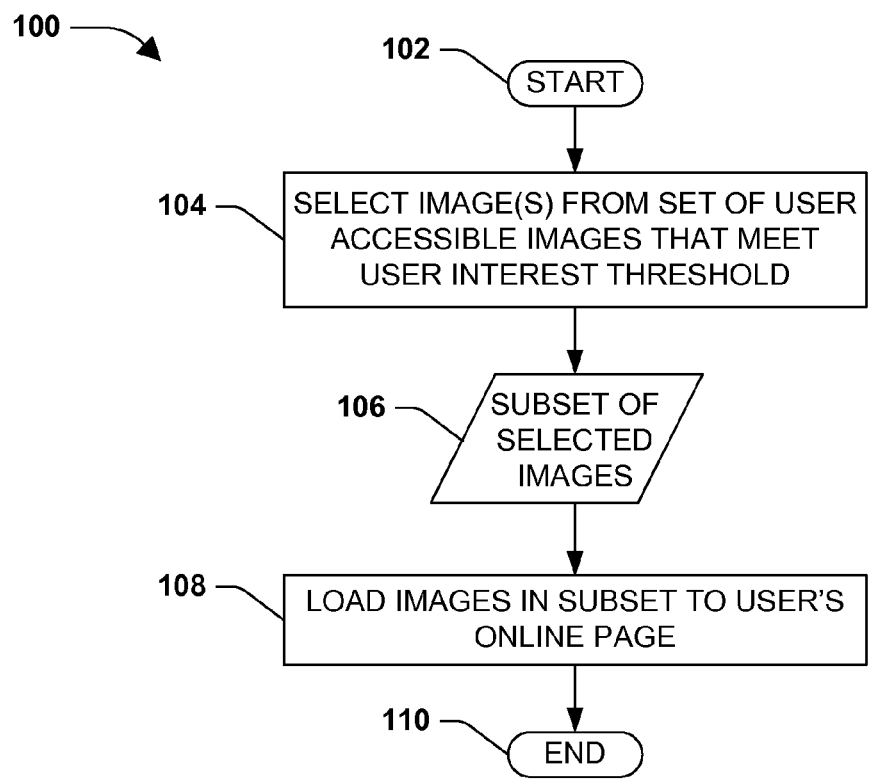
FIG. 1 is a flow diagram of an exemplary method for displaying images in a user's online page.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that can provide for a more rich, engaging and aesthetically pleasing entry point into a user's online page, for example, when viewing or interacting with their own content. FIG. 1 is a flow diagram of an exemplary method 100 for displaying images in a user's online page. The exemplary method 100 begins at 102 and involves identifying a subset 106 of one or more images from a set of user accessible images, at 104. The identifying of the subset of selected images 106 comprises selecting one or more images from the set of user accessible images that meet a desired user interest threshold.

An online user (e.g., accessing the Internet) can upload images from a variety of sources to a variety of online locations. For example, the user may have images locally stored (e.g., stored on a hard drive in or attached to their computer, or stored on network storage connected to the client) that comprise images taken by the user or others, downloaded from the internet, and/or received by third parties. Further, the user may utilize one or more online storage sites, social networking sites, image collection sites to store and/or manage images. Additionally, images can be retrieved from a plurality of locations online, such as by performing image searches using a search engine, browsing and selecting images online, or peer-to-peer networking, for example.

While there are an almost unlimited number of images accessible to the user, not all of the images accessible to the user may be of interest to the user. Therefore, in order to provide a more engaging experience for the user, for example, merely a subset of the set of accessible images can be selected, as in 106 of FIG. 1. In one embodiment, identifying the subset of one or more images can comprise comparing metadata from images in the set of user accessible images with potential user interests.

Some image files contain metadata that can be read, for example, to determine features of the image. A digital photograph, or video still, may contain metadata that can be read, for example, to determine a make and model of a camera used to capture the image, properties of the image (e.g., exposure, lens type, etc.), geotag data that identifies a location of the image subject, and metadata that is written to the image file, such as by the user or a third party. Metadata can be written into a digital image file to identify, for example, who owns the image, copyright information, contact information, and descriptive information such as keywords about the photo. In one embodiment, the metadata can make the file searchable on a computer and/or the Internet. Some metadata may be written to the file by the image capture device, while some metadata can be input by the photographer, user, a third party, and/or image management software.

Further, some image files can comprise "title" tags or "alt" tags. In general, these tags can define a piece of text that is associated with the image, which may be displayed instead of (alternately) or concurrently with an image when the image is interacted with (e.g., mouseover event). Often, these types of image tags comprise descriptive information about the image, for example, so that when a user views the image the text can give them some context. As an example, when a user moves their cursor over a picture of a mountain, the title or alt tag may display the text "Mount Fuji in summer," thereby giving the user information about the image.

In one embodiment, the metadata that comprises descriptive information for respective images in the set of user accessible images can be identified, and/or image tags can be identified from respective images in the set of user accessible images. In this embodiment, the descriptive information identified from the metadata and/or the image tags can be compared against potential user interests. As an example, those images that have descriptive information that match the potential user interests may be selected for the subset. In this example, the desired threshold may comprise matching a piece of descriptive information with a potential interest, such as the user having a friend in their social network (e.g., a user interest), and an image having descriptive information matching the friend's name.

At 108 in the exemplary method 100, an arrangement (e.g., slide show) of the images in the subset 106 is loaded to the user's online page. For example, as illustrated in an example embodiment 200 of FIG. 2, the user may utilize a browser to navigate to the user's online page 202. As an illustrative example, the user's online page 202 may be hosted by a website that serves as online suite of collective services, applications, and/or storage solutions for users. For example, one of the services may comprise a user media management service, where users can upload and store images, videos, etc., view the stored media, compile arrangements, and share with other users or online services.

Figure 2:
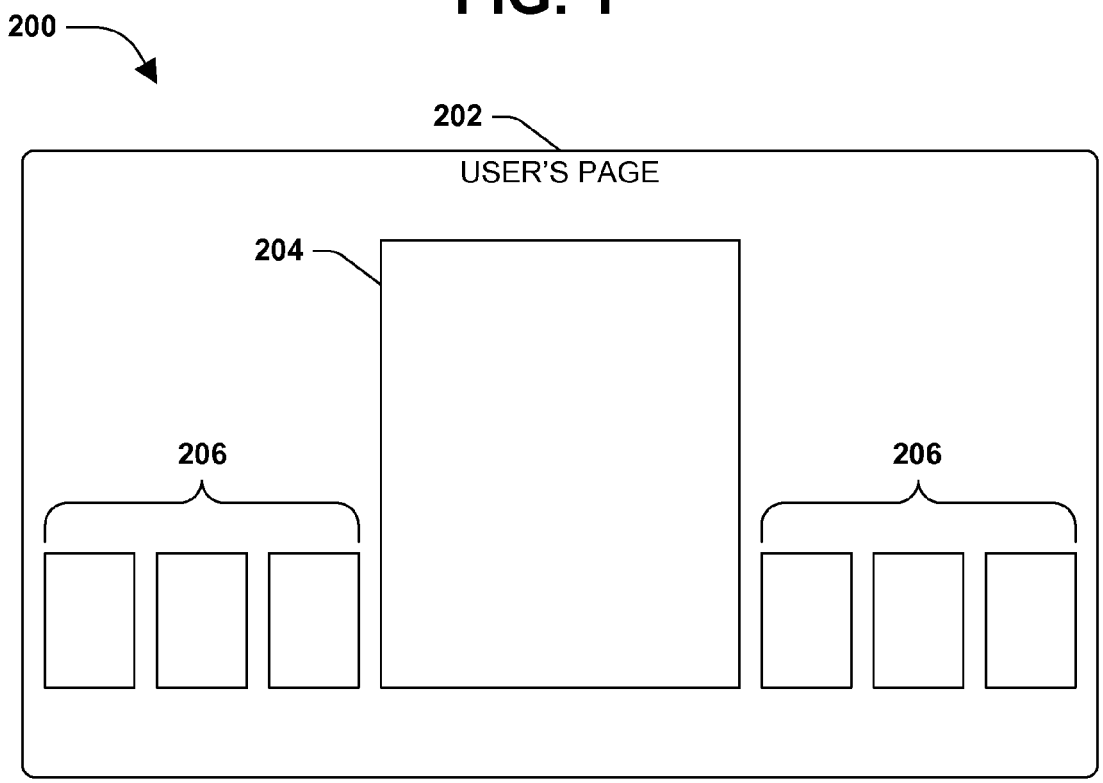
FIG. 2 is an illustration of an example implementation of one or more techniques and/or systems described herein.

By way of example, turning to the example embodiment 200 of FIG. 2, when the user's online page 202 is loaded to the browser (e.g., the user opens the user's online page 202), a slide show presentation, comprising the subset of selected images 106, can be loaded to the page. In this example, the slide show can comprise a primary image 204 displayed prominently, and a collection of smaller (e.g., thumbnail) images 206 that comprise at least a portion of the slide show of the subset of images. In one embodiment, the primary image (e.g., 204) can be larger than other images (e.g., 206) displayed from the subset. In one embodiment, the primary image 204 can comprise an image from the subset that has a highest level of user interest associated with the image (e.g., more tags match more user interests). In another embodiment, the primary image can comprise a randomly chosen image from the subset.

Having loaded the slide show of images to the user's online page, the exemplary method 100 ends at 110.

Figure 3:
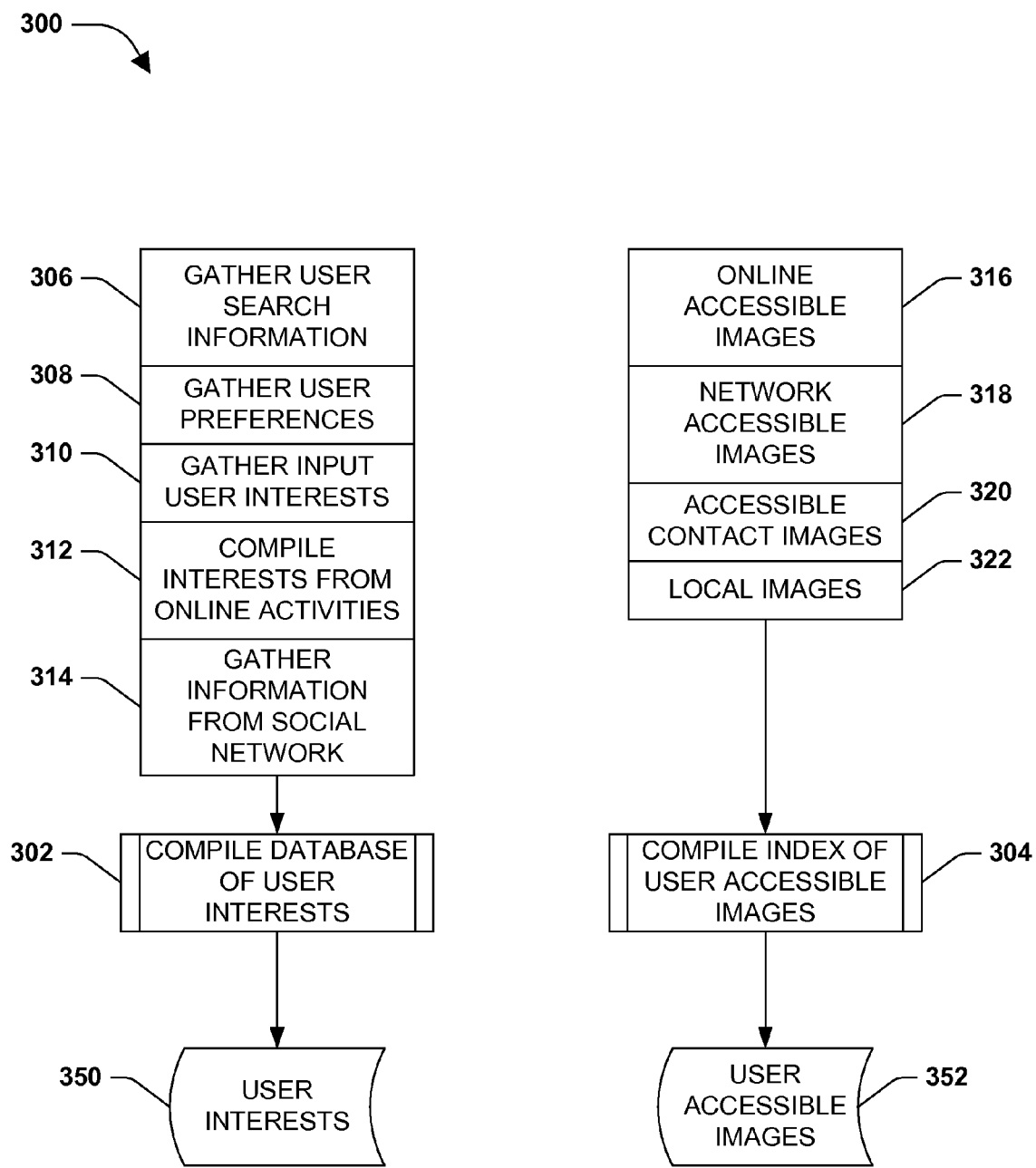
FIG. 3 is a flow diagram illustrating an example embodiment of an implementation of one or more techniques described herein.

FIG. 3 is a flow diagram illustrating an example embodiment 300 of an implementation of at least some of one or more techniques described herein. At 302, a database of user interests 350 can be compiled. In one embodiment, potential user interests can be identified from a plurality of online information associated with the user. For example, information can be identified from: the user's online social network; the user's online activities; the user's identified personal interests; the user's preferences; and/or the user's online searches; but is not limited merely to these examples.

At 306, the user's search-related information can be gathered. Search-related information can comprise keywords, events, people, activities, topics, and/or other things the user enters into search queries (e.g., in a search engine). Further, information about results from searches that the user selects and interacts with, for example, can be used as user interest information. As an example, a user may regularly search for information about Elvis Presley, and Memphis, Tenn. Then the user may select webpages, maps, etc. from the returned results. This information can provide the database with a user interest about these topics.

At 308, user preferences can be gathered. For example, user may input preferences about particular areas of interest and/or preferences about particular images, such as at the website hosting the user's online page. As an illustrative example, the user may indicate that they wish to see (or do not wish to see) pictures of a particular type, topic, depiction, size, scope, or other descriptive value (e.g., no cats, no images smaller than a×b pixels, only portrait view, more buildings, more night images, fewer people, etc.).

At 310, user interests that have been input by the user can be gathered. In one embodiment, the website hosting the page, and/or other websites accessed by the user, may provide a means for inputting their interests. For example, websites that are repeatedly visited by the user (e.g., the user's online start page), or those that attempt to create a profile for the user, often provide a way for users to input their interests, such as movies, actors, TV shows, people, music, and much more. Further, the websites often provide a way for the users to input their locations (e.g., residence, and/or current location), preferred places to visit/see, places they have previously lived, worked or visited, and more. These user input interests can be gathered and compiled for the database of user interests.

At 312, user interests may be compiled from the user's online activities. For example, the websites that the user visits can be tracked, and information associated with these sites can be identified as potential user interests. For example, if a user frequents a recipe website, goes to online gaming sites, forums about fishing, online stores that sell bike parts, or chats online at Russian speaking sites. This information can be used to identify potential user interests.

Further, at 314, information from the user's online social networking can be used to identify potential user interests. For example, users of online social networking typically identify friends, contacts, trending interests (e.g., what they are currently interested in), videos, images, news, likes, dislikes, groups, games, and/or other things that are of particular interest to the user when interacting on one or more of the social networking sites. Additionally, connections to the user in one or more social networking sites may provide access to items of interest of the user, which the user may view, interact with, or indicate an interest in (e.g., like). This information may be used to identify potential user interests.

In one embodiment, at least some of these potential user interests can be identified, gathered, and/or compiled to the database. In the example embodiment 300, the database can comprise a plurality of user interests 350, such as identified by from the plurality of online information associated with the user from 306, 308, 310, 312 and/or 314.

At 304 in the example embodiment 300, an index of user accessible images 352 can be compiled. As described above, user accessible images can comprise an almost unlimited number of images, which can come from a variety of locations. In one embodiment, compiling the index of user accessible images 352 can comprise identifying locations of the images (e.g., storage address, network location, URL, etc.) and storing the locations in a database that indexes the images. In this way, for example, storing a way to find the images (e.g., address, map, etc.) can be far less costly (e.g., at least in terms of memory utilization) in storage resources than storing the actual image.

At 316, user accessible images can be identified from online sources. For example, images can be found on search engine sites, image collection sites, news sites, and/or many other websites that use images. At 318, user accessible images can be identified from a network connected to the user. For example, the user may be connected to a local area network, storage area network, or some other network where images are stored, distributed and/or used in some other way where access to the images is provided to the user.

At 320, images that are accessible to the user through the user's contacts may be identified. For example, the user may have connections on their social networks, other online sites, and/or in their address books where the contacts provide access to their own images. Often, a connection to the user uploads images to their own online profile or storage location so that the user (and other connections) can view, comment on, and/or download the image. Further, at 322, the user may store images locally, such as on their computer, or an attached hard drive. In this embodiment 300, all or some of these images may be accessible to the user and used to compile the index of user accessible images 352.

In one aspect, the information utilized for user interests, and/or for user accessible images can be identified in a manner that respects and/or protects the user's privacy. In one embodiment, the information that identifies user interests can be retrieved without any particular user identifiable information (e.g., personal information that may reveal the user's identity). Further, in one embodiment, the information may be retrieved without revealing any of the user's personal security information (e.g., SSN, account numbers, passwords, etc.). Additionally, in one embodiment, the user may be able to block access to desired information, and/or manage settings that allow access into some areas and not others, for example. In this way, for example, the user can choose a desired manner for enabling an image presentation experience.

Figure 4:
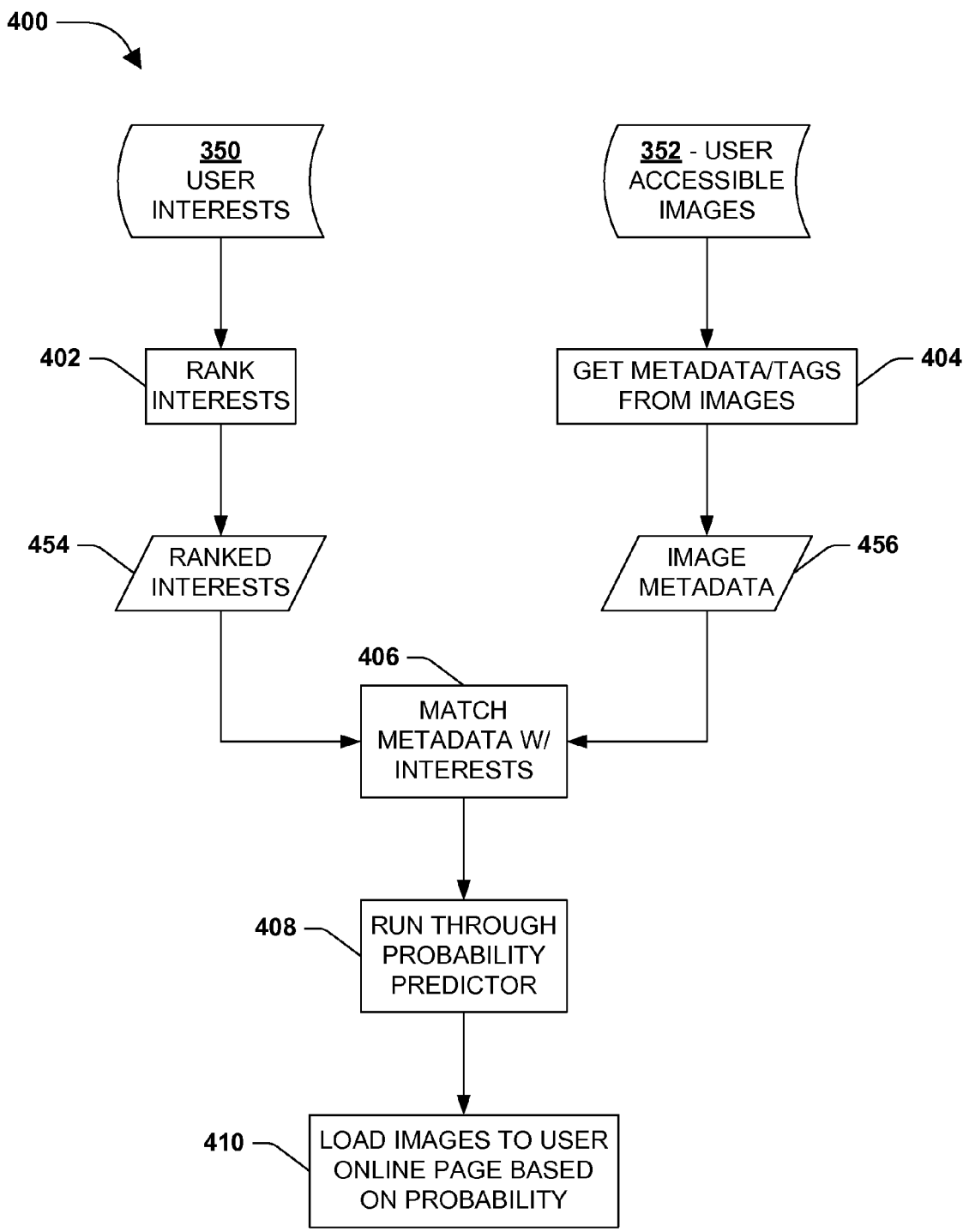
FIG. 4 is a flow diagram illustrating another example embodiment of an implementation of one or more techniques described herein.

FIG. 4 is a flow diagram illustrating another example embodiment 400 of an implementation of at least some of one or more techniques described herein, where FIG. 4 may continue from FIG. 3. At 402, the user interests 350 (e.g., from the database) can be ranked. In one embodiment, potential user interests can be ranked based on an online connectivity level with the respective potential user interests. For example, online connectivity level can comprise a number of times and/or an amount of time the user is involved with a particular interest.

As an illustrative example, the user may indentify particular connections (e.g., on social networks) as favorites, thereby increasing their online connectivity level. As another example, the user may recently have been searching for information about Ireland (e.g., when planning a trip), therefore, in this example, the online connectivity level for "Ireland" may temporarily increase during the searching period. As another example, the user may have recently uploaded a number of pictures to their online image management service. In this example, a closeness to the present time may increase the online connectivity, such as to allow fresh content (e.g., images) to be presented. Further, as an example, a user that goes online to play a particular game may increase an interest linked to that game the longer they are participating.

In one embodiment, the amount of online connectivity can be correlated to the ranking for the interest, thereby resulting in a database of ranked user interests 454, for example. For example, a particular interest having a highest online connectivity level may comprise the highest ranked user interest. That is, in this example, if the user visits sites and searches related to Ireland more than anything else, "Ireland" may have a highest ranking as a potential user interest at that time (e.g., where such rankings may change over time). It will be appreciated that the techniques described herein for online connectivity levels are not limited to the example described above. It is anticipated that those skilled in the art may devise alternate techniques for measuring online connectivity levels, which may comprise, for example, a combination of various connectivity events online.

At 404, information from the metadata and/or image tags can be retrieved from the user accessible images 352. As described above, images can comprise a plurality of information that is descriptive of the image. For example, the metadata may describe the subjects, locations, and/or type of image. As an illustrative example, when uploading an image to an online service, the user may write/type in the names of the people in the photo, along with what was going on at the time. Further, in this example, a geotag can identify the location, and metadata can identify a time and type of photo. The image metadata 456 can be retrieved for at least some or all of the accessible images 352, and in one embodiment, stored or indexed in the database in association with the corresponding image.

At 406, the metadata 456 can be matched with one or more ranked user interests 454, such as to identify the subset of images, as described above. In one embodiment, a first subset of image may be selected, where the metadata associated with the respective images in the first subset matches at least one potential user interest within a desired ranking range. That is, for example, a desired range may comprise the user's top ten interests, from the ranked interests 454. In this embodiment, the first subset can comprise merely those images having metadata that matches one of the top ten interests, for example.

In another embodiment, a first subset of image may be selected, where the metadata associated with respective images in the first subset matches a desired number of potential user interests. That is, for example, a desired number of interests may comprise a particular number, such as at least two. In this example, those images that have metadata that match at least two user interests can be selected for the first subset of images.

Further, in one embodiment, when identifying the subset of one or more images from the set of user accessible images, a second subset of images can be selected from the first subset. In this embodiment, identifying images for the second subset can comprise selecting one or more images from the first subset that meet the desired user interest threshold.

In one embodiment, selecting one or more images from the set that meet the desired user interest threshold can comprise combining a potential user interest rank with a number of matched potential user interests for the metadata from respective images in the set. For example, a particular image may comprise metadata that matches merely one user interest that is ranked at number three. Further, a second image may comprise metadata that matches two user interests, ranked five and six. In this embodiment, the combined ranking of the second image may yield a preferable result (e.g., higher overall ranking) than that of the first image. Additionally, in this embodiment, a desired number of images from the set can be selected that meet the desired threshold for the combination of potential user interest rank with a number of matched potential user interests for the metadata. That is, the combined ranking result can be compared against a combined ranking result threshold to yield preferred selection criteria.

At 408 in the example embodiment 400, the selection of images can be run through a probability predictor (e.g., a probability algorithm) to determine a probability of user interest in a particular image. In one embodiment, selecting one or more images from the set that meet a desired user interest threshold can comprise determining a user interest probability for respective images in the set, and selecting merely those images that meet a desired user interest probability.

In one embodiment, the user interest probability can be determined for respective images in the set until a desired number of images are selected for the subset. For example, the user may merely wish for a particular number of images to be comprised in the slide show. In this embodiment, for example, the user interest probability can be determined and compared against the probability threshold for images in the set, and when the desired number is reached with those images that meet the threshold, the probability determination can be concluded (e.g., remaining images in the set are not considered at that time). Additionally, when an insufficient number of images are selected the user interest probability may be reduced so that more images meet the threshold. Similarly, the interest probability may be increased to reduce the number of images selected.

At 410, the images selected, such as in the subset, are loaded to the user's online page, based on the probability. In one embodiment, the subset of images selected for presentation on the user's online page can be updated regularly or on an ongoing basis. For example, as the user's interests change (e.g., new friends, more recent images uploaded, news, new plans or projects) the ranking and/or probability used to select the images can change. Further, the set of user accessible images can also change over time. For example, images may no longer be available online, connections to others may be lost, and/or the user may delete some images from their local storage. In this embodiment, one or more of the techniques described herein, or portions thereof, can be used to constantly, or at desired intervals, change the presented slide show, for example, by changing the images, and/or the order of presentation.

Figure 5:
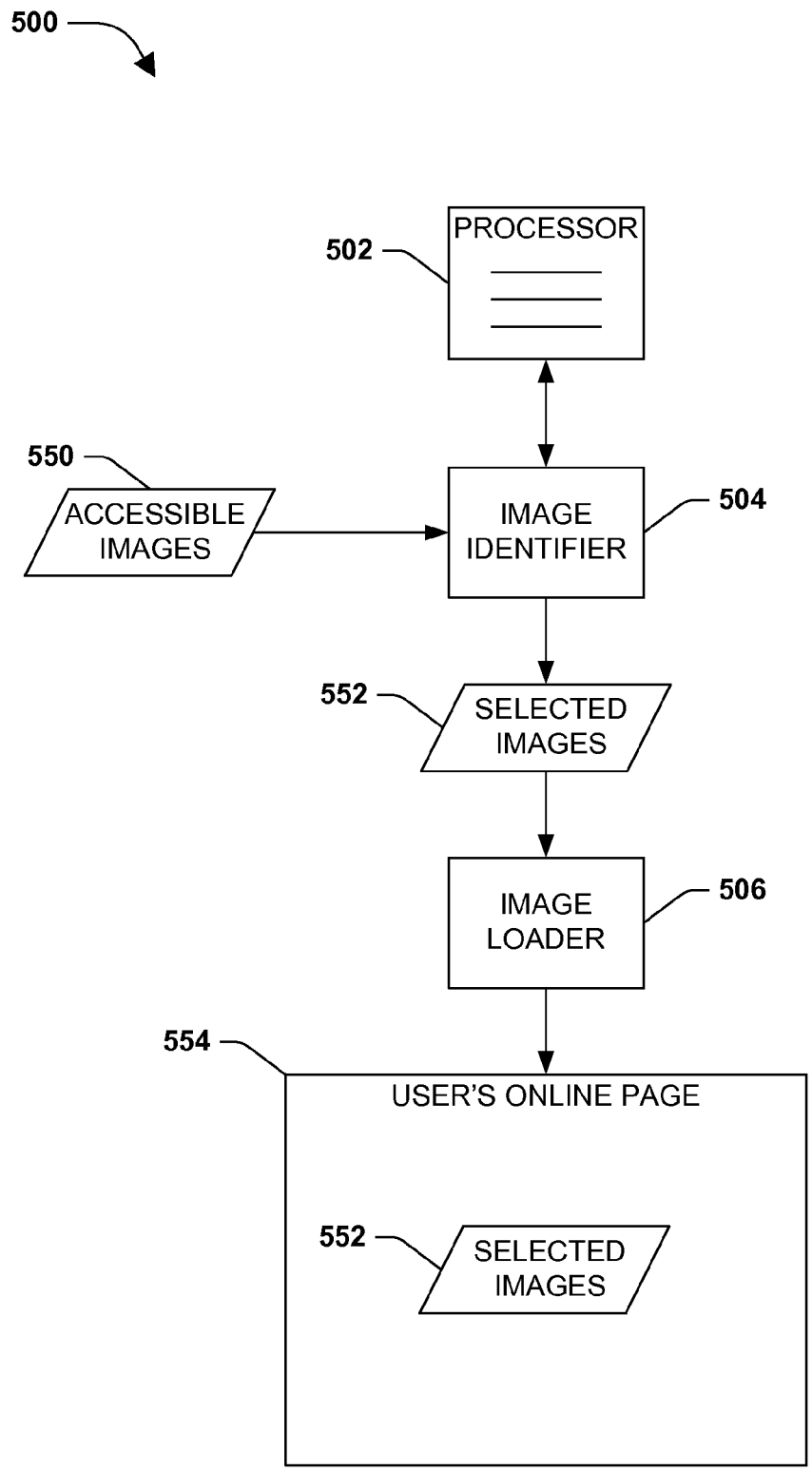
FIG. 5 is a component diagram of an exemplary system for displaying images in a user's online page.

A system may be devised that can provide for a more rich, engaging and aesthetically pleasing entry point into a user's online page, for example, when viewing or interacting with their own content. FIG. 5 is a component diagram of an exemplary system 500 for displaying images in a user's online page. A processor 502 processes data for the system, and an image identification component 504 is operably coupled with the processor. The image identification component 504 selects one or more images 552 that meet a desired user interest threshold from images 550 that are accessible to the user (e.g., locally, remotely, online, etc.). An image loading component 506 is operably coupled with the image identification component 504. The image loading component 506 loads the selected images 552 to the user's online page 554 in an arrangement.

Figure 6:
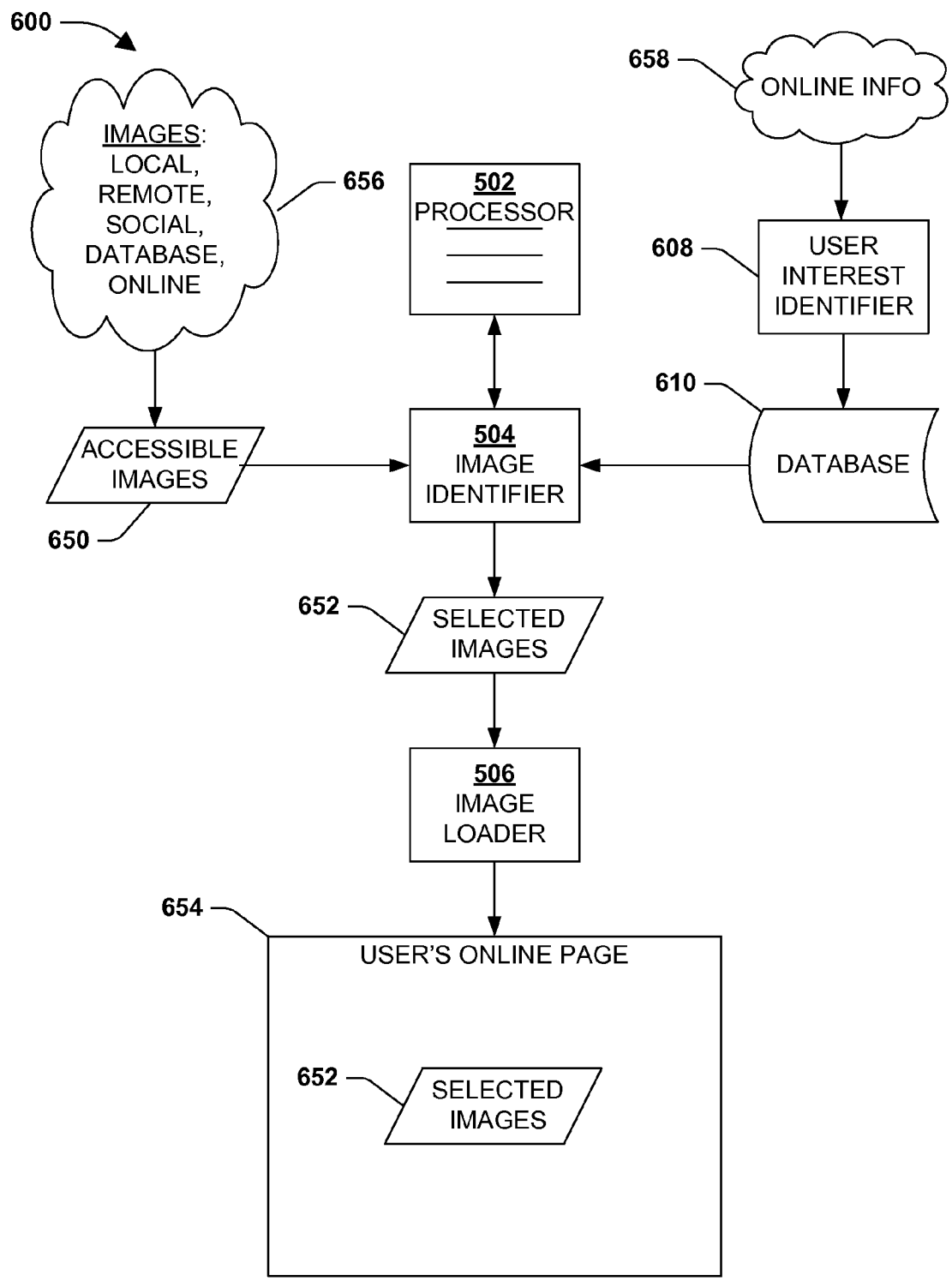
FIG. 6 is a component diagram illustrating one embodiment of an implementation of one or more systems described herein.

FIG. 6 is a component diagram illustrating one embodiment 600 of an implementation of at least some of one or more systems described herein. A user interest identification component 608 identifies user interests from a plurality of online information 658 associated with the user. For example, the user interest identification component 608 can follow the user's online activity, such as social networking and/or searching, for example, and identify the user's preferences and input interests, in order to identify a plurality of potential user interests. A database component 610 can be used to index the potential user interests from a plurality of online information associated with the user, which has been identified by the user interest identification component 608. In one embodiment, the database component can stored the indexed information in the cloud (e.g., online accessible servers associated with a service), and/or locally (e.g., a local client or networked storage).

In this embodiment 600, the image identification component 504 can compare metadata from the user accessible images 650 with the index of potential user interests in the database 610 to identify one or more potentially interesting images 652. For example, the image identification component 504 can attempt to match one or more user interests with one or more images, and if a match is found, select the image to display on the user's online page 654 if it meets the desired threshold. Alternately, the matching may comprise meeting the desired threshold, for example, where the desired threshold comprises a number of interests matching a number of metadata/tag based information for the image.

In this embodiment 600, the user accessible images 650 can comprise images from a plurality of sources 656: the user's local machine (e.g., hard drive); stored remotely by the user (e.g., in an online storage service); from connections in the user's social network (e.g., online social network comprising uploaded photos); from a database of images, such as networked or remote database (e.g., from search engine and/or image compilation); and/or from other online sources. It will be appreciated that user accessible images can comprise any image that may be retrieved for display to the user. That is, for example, on some occasions, the user may not actually be able to retrieve a particular image to their local machine, but the image may be available for remote viewing online (e.g., due to copyright, access, or other issues).

Figure 7:
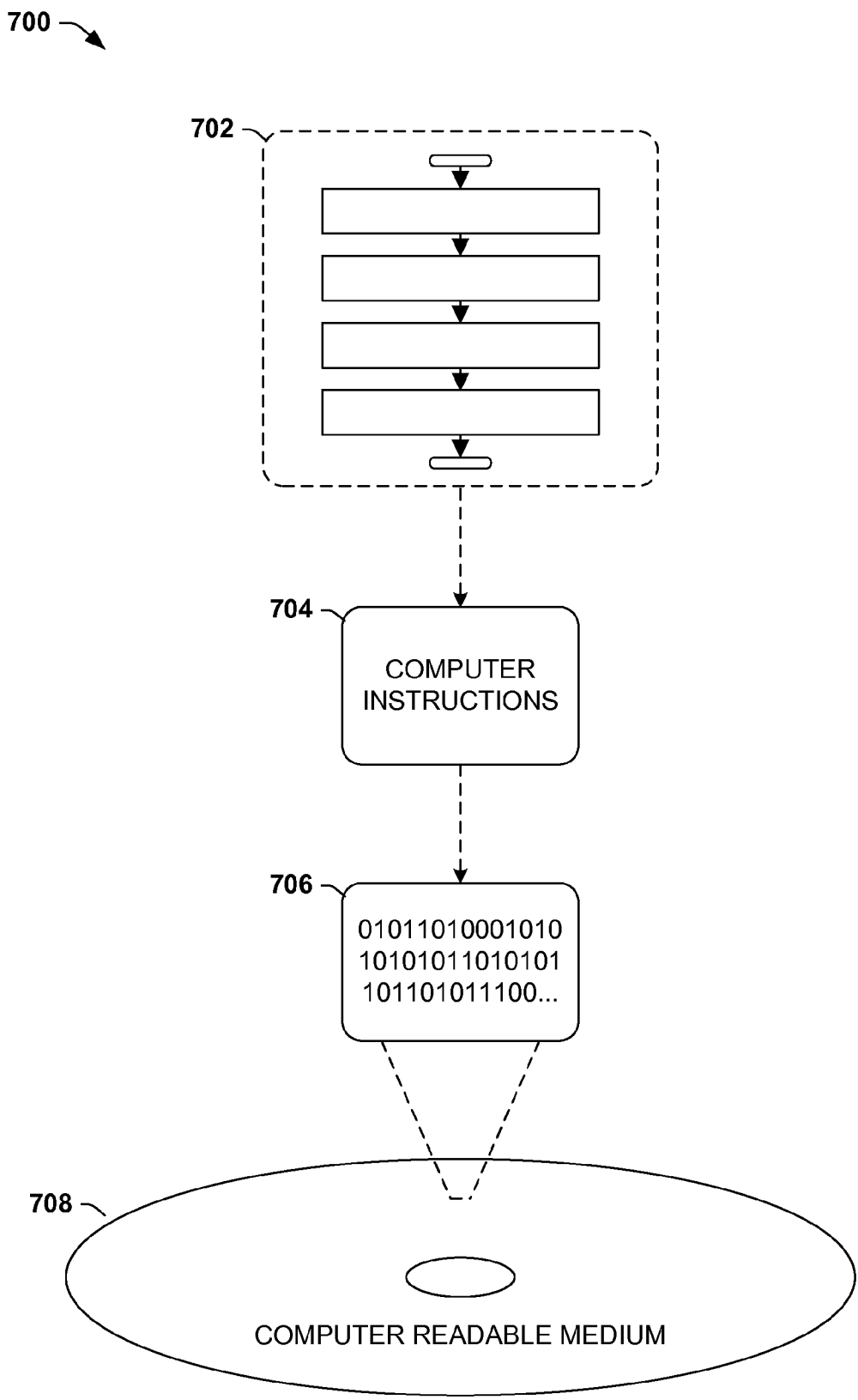
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
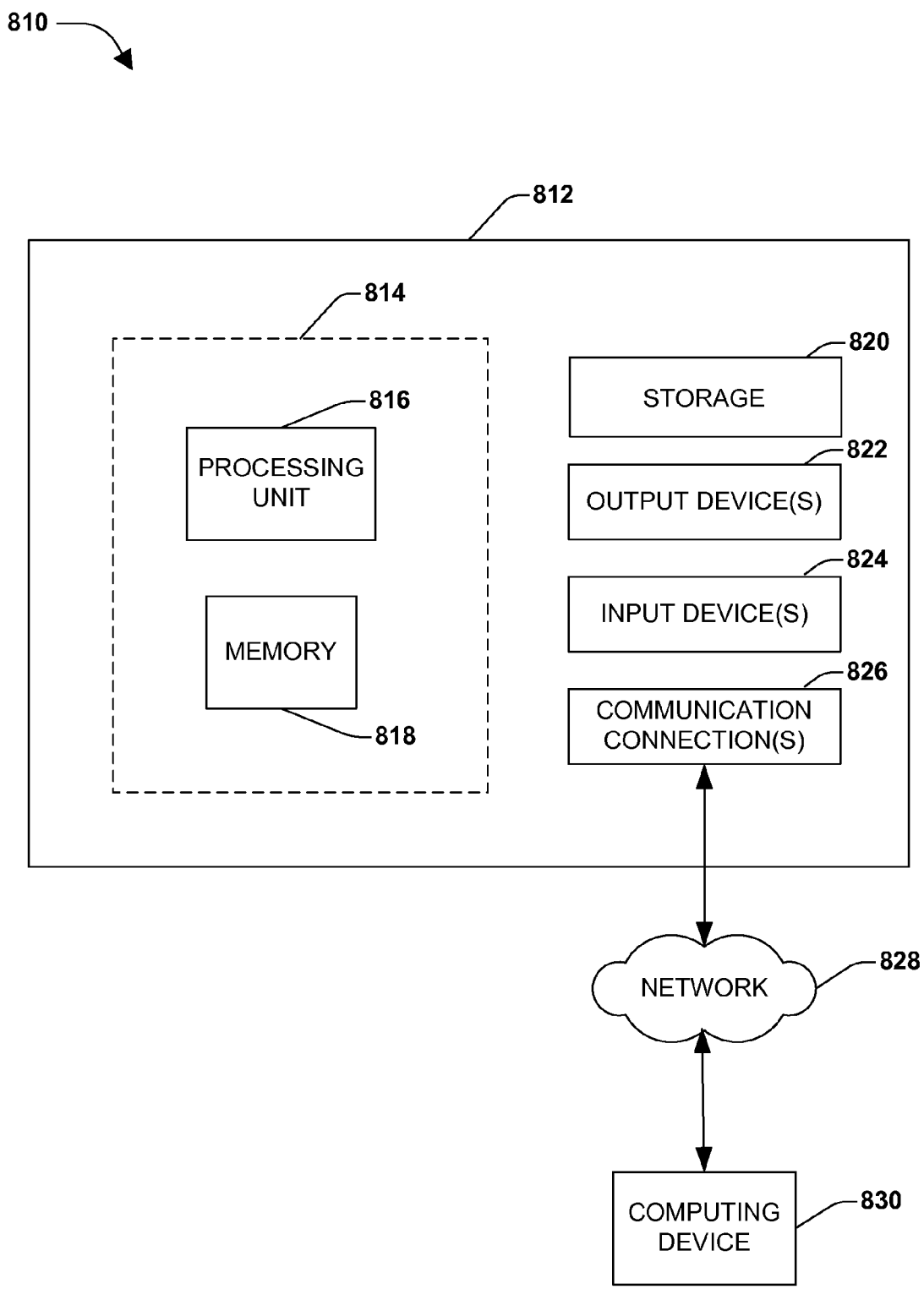
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for displaying images, comprising:
   identifying potential user interests of a user based on a set of user activities by the user, at least one of the user activities being independent of an online image service that stores a set of images in association with the user;
   based on the set of user activities, identifying in online connectivity levels associated with the potential user interests, each online connectivity level corresponding to a particular one of the potential user interests and indicating at least one of a number of times the user is involved with the particular potential user interest or an amount of time the user is involved with the particular potential user interest;
   generating a ranked set of user interests by ranking the potential user interests based on the online connectivity levels associated with the potential user interests;
   receiving a user request to access the online image service;
   selecting a subset of images, from a set of images accessible to the user on the online image service, that meet an interest threshold based on the ranked set of user interests; and generating an online landing page of the online image service, wherein the online landing page is customized for the user and displays an arrangement of at least some of the images that are included in the subset of images.

2. The method of claim 1, wherein the identifying the potential user interests comprises:
identifying the potential user interests based on an online social network associated with the user.

3. The method of claim 1, wherein the identifying the potential user interests comprises:
identifying the potential user interests based on information about websites previously visited by the user.

4. The method of claim 1, wherein the online image service comprises a website configured to provide image services for the user to allow, view, and manage a collection of images.

5. The method of claim 1, wherein identifying the potential user interests comprises:
identifying a first potential interest of the potential interests based on a first online search; and
identifying a second potential interest of the potential interests based on a second online search; and
wherein the ranking the potential user interests comprises:
ranking the first potential interest relative to the second potential interest based on when the first online search was conducted and when the second online search was conducted.

6. The method of claim 1, wherein the selecting the subset of images comprises:
selecting the subset based on the metadata associated with each image in the subset corresponding to at least two of the potential user interests.

7. The method of claim 1, wherein the set of images comprises a first locally stored image and a second remotely stored image.

8. The method of claim 1, wherein the arrangement displayed on the online landing page comprises the at least some of the images arranged in a row, the row including a primary image that is larger than others of the at least some of the images in the row.

9. The method of claim 8, wherein the primary image comprises an image from the subset of images having a highest level of user interest.

10. The method of claim 1, wherein the subset of images comprises a first locally stored image and a second remotely stored image.

11. The method of claim 1, wherein generating the online landing page comprises:
generating at least one thumbnail view of at least one image in the subset.

12. The method of claim 8, wherein the primary image comprises a randomly chosen image from the subset of images.

13. The method of claim 1, wherein the subset of images comprises a first subset of images, and further comprising:
comparing the potential user interests to metadata that is associated with the images in the set of images to identify a second subset of images, the metadata associated with each image in the second subset corresponding to at least one of the potential user interests;
wherein selecting the first subset of images comprises:
selecting the first subset of images from the second subset of images.

14. The method of claim 13, further comprising:
determining a combined ranking result for each image in the second subset, the combined ranking result for each image in the second subset based on a combination of a rank of each potential user interest to which the metadata associated with the image corresponds and a number of interests to which the metadata associated with the image corresponds;
wherein selecting the first subset of images comprises:
comparing the combined ranking result for each image in the second subset to a combined ranking threshold to determine the first subset of images, the combined ranking result of each image in the first subset being greater than or equal to the combined ranking threshold.

15. A system, implemented at least in part via a processing unit, for displaying images, comprising:
a user interest identification component configured to:
identify potential user interests of a user based on a set of user activities by the user, at least one of the user activities being independent of an online image service that stores a set of images in association with the user;
based on the set of user activities, identify online connectivity levels associated with the potential user interests, each online connectivity level corresponding to a particular one of the potential user interests and indicating at least one of a number of times the user is involved with the particular potential user interest or an amount of time the user is involved with the particular potential user interest;
generate a ranked set of user interests by ranking the potential user interests based on online connectivity levels associated with the potential user interests;
an image identification component configured to select a subset of images, from a set of images accessible to the user on the online image service, that meet an interest threshold based on the ranked set of user interests; and
an image loading component configured to load an arrangement of at least some of the images that are included in the subset of images, for display in an online landing page of the online image service.

16. The system of claim 15, wherein the potential user interests are based on an online social network associated with the user.

17. The system of claim 15, wherein the user interest identification component is configured to identify the potential user interests based on one or more previous online activities of the user.

18. The system of claim 15, wherein the subset of images comprises a first subset of images, and wherein the image identification component is configured to compare the interests to metadata that is associated with the images in the set of images to provide a second subset of images, the metadata associated with each image in the second subset corresponding to at least one of the potential user interests; and
wherein the image identification component is configured to select the first subset of images from the second subset of images.

19. The system of claim 18, wherein the image identification component is configured to determine a combined ranking result for each image in the second subset, the combined ranking result for each image in the second subset based on a combination of a rank of each potential user interest to which the metadata associated with the image corresponds and a number of interests to which the metadata associated with the image corresponds; and
wherein the image identification component is configured to compare the combined ranking result for each image in the second subset to a combined ranking threshold to determine the first subset of images, the combined ranking result of each image in the first subset being greater than or equal to the combined ranking threshold.

20. A computing system comprising:
   at least one processor; and
   memory storing instructions executable by the at least one processor, wherein the instructions configure the computing system to:
   identify one or more potential user interests of a user, wherein the one or more potential user interests are identified independent of an online image service that stores a set of images in association with the user and based on at least one of:
      an online social network associated with the user, one or more online activities of the user, one or more identified personal interests of the user, or one or more online searches of the user;
   select a subset of one or more images, from a set of images accessible to the user on the online image service, that meet a desired interest threshold for the user based upon the one or more potential user interests; and
   load an arrangement of at least some images in the subset of images for display within an online landing page of the online image service.

* * * * *